United States Patent [19]

Wernicke

[11] Patent Number: 5,114,096
[45] Date of Patent: May 19, 1992

[54] TAIL SITTER AIRPLANE

[76] Inventor: Kenneth G. Wernicke, 409 Circleview N., Hurst, Tex. 76054

[21] Appl. No.: 558,612

[22] Filed: Jul. 27, 1990

[51] Int. Cl.⁵ ............................................. B64C 29/02
[52] U.S. Cl. ................................ 244/7 B; 244/45 A; 244/87
[58] Field of Search ............... 244/7 R, 7 B, 45 A, 244/89, 87; D12/326, 331, 332

[56] References Cited

U.S. PATENT DOCUMENTS

| | | | |
|---|---|---|---|
| 1,358,603 | 11/1920 | Zahm | 244/7 B |
| 1,720,960 | 7/1929 | Lilley | 244/89 |
| 2,382,460 | 8/1945 | Young | |
| 2,387,762 | 10/1945 | Leonard | 244/7 B |
| 2,397,632 | 4/1946 | Stuart | |
| 2,578,578 | 12/1951 | Myers | |
| 2,622,826 | 12/1952 | Prince | |
| 2,794,609 | 6/1957 | Perry | |
| 3,096,952 | 7/1963 | Roppel | |
| 3,116,040 | 12/1963 | Petrides | |
| 3,120,359 | 2/1964 | Sprecher | |
| 3,253,809 | 5/1966 | Robertson | 244/89 |

Primary Examiner—Galen Barefoot
Attorney, Agent, or Firm—James E. Bradley

[57] ABSTRACT

A tail sitter airplane will take off and land on its tail section, with its fuselage and nose pointed up. The airplane has a single driven propeller mounted to the nose section. Wings extend outward from the fuselage. Four airfoils locate in the tail section, two horizontal and two vertical. Each has a control surface. Four additional airfoils locate in a forward section, behind the propeller and in front of the wings. Two of the airfoils in the forward section are horizontal and two vertical. Movable control surfaces on these airfoils control the flight during takeoff and landing. The airfoils have chord lengths selected to remove the twist from the slipstream from the propeller, thereby balancing the torque from the propeller.

15 Claims, 3 Drawing Sheets

TAIL SITTER AIRPLANE

BACKGROUND OF THE INVENTION

1. Field of the Invention

This invention relates in general to a vertical takeoff and landing airplane, and in particular to an airplane which takes off and lands on its tail section with its fuselage pointed up.

2. Description of the Prior Art

One need for a vertical takeoff and landing airplane is in the area of unmanned aerial vehicles. These airplane need to be able to be launched and landed on a ship or other place which would not have an airstrip. An unmanned airplane contains surveillance equipment, such as television cameras and night vision equipment. An operator will control the unmanned airplane by the use of radio signals In the prior art, these airplane were large versions of conventional radio control model airplanes. They can be launched from a ship by using a catapult. However, it is difficult to land the unmanned airplane. Operators sometimes use nets to try to catch them as they approach the ship.

Full scale manned vertical takeoff and landing aircraft are available. These include helicopters, a tilt wing propeller aircraft, and also jet airplanes with deflecting nozzles. These types of vertical takeoff and landing aircraft have not been efficiently scaled down to be used as an unmanned aerial vehicle for surveillance. Generally they have too much complexity, making them too expensive.

One type of vertical takeoff and landing airplane proposed in the past is known as a "tail sitter". A tail sitter airplane takes off and lands on its tail section, with its nose pointed upward. In the 1950's and 1960's, full scale manned tail sitting airplane were built. Some utilized jet propulsion. Others used propellers. There are many variations suggested in the patented art for tail sitters.

One problem with a tail sitter airplane is how to handle the counter torque caused by the rotating propeller during takeoff and landing. Without some means, the fuselage would spin in reverse to the rotating propeller. This is handled generally by using counter rotating propellers. One rotates in one direction, while the other propeller rotates in the opposite direction. This eliminates the counter torque. However, mechanical complexity results.

SUMMARY OF THE INVENTION

The airplane of this invention is of a tail sitter type. It has a fuselage with a nose section and a tail section. The airplane will take off and land on the tail section with the nose section pointed up. The airplane is also capable of cruising with the fuselage horizontal.

The airplane has a single driven propeller. Counter torque is handled by utilizing airfoils in the slip-stream of the propeller. These airfoils will remove the twist from the slip-stream to reduce and eliminate the counter torque. The airfoils have a total chord length that is approximately equal to or greater than the circumference of the contracted slip-stream from the propeller. This provides sufficient surface to remove the twist from the slip-stream.

In one embodiment, the propeller is of a collective pitch type. The pitch is constant during a revolution as the blade swings about the propeller shaft. Collective pitch propellers also include fixed pitch propellers and variable pitch propellers. In a variable pitch propeller, the pitch of all of the blades can be changed together, but not cyclically. To assist in controlling the flight during takeoff and landing, four airfoils are mounted between the wing and the propeller. These airfoils are perpendicular to each other, two extending horizontally, and two extending vertically. Each of the airfoils has a movable control surface. These control surfaces will move relative to the fuselage to provide pitch and yaw control.

Preferably, the tail section also has four airfoils. Two of the airfoils extend rearward from the wing. The other two airfoils extend vertically above and below the fuselage at the tail of the airplane. Each of the rearward airfoils has a movable control surface to assist in flight control.

In a second embodiment of the invention, the forward airfoils are eliminated. The collective pitch propeller is replaced with a cyclic pitch propeller. It utilizes a swash plate which enables the pitch to vary on each blade as it swings through a revolution or cycle. The cyclic pitch propeller provides steering control during takeoff and landing. The word "propeller" also encompasses all forms of blade devices for propelling an aircraft, including rotors for helicopters which flap.

DETAILED DESCRIPTION OF THE INVENTION

Figure 1:
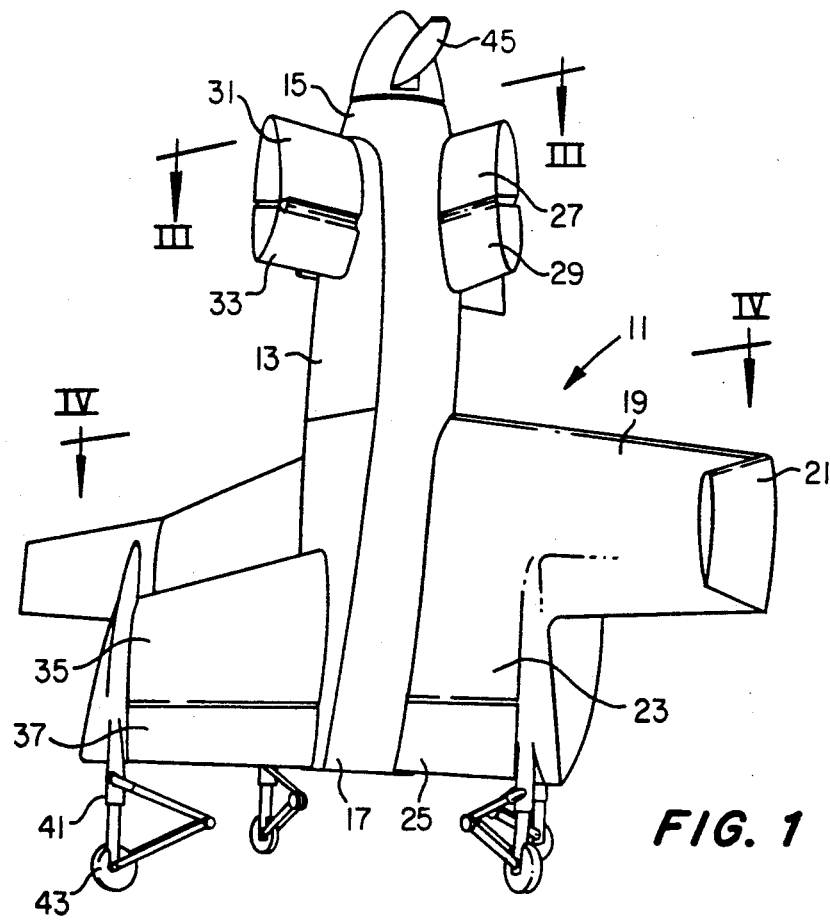
FIG. 1 is a perspective view, as seen from the upper side, of a tail sitter airplane constructed in accordance with this invention.

Referring to FIG. 1, airplane 11 is constructed particularly for use as an unmanned aerial vehicle, but it could be utilized as a full scale manned vehicle with modifications. Airplane 11 has a longitudinal fuselage 13. Fuselage 13 has a nose section 15 on the forward end and a tail section 17 on the rearward end.

A pair of wings 19 extend outward from fuselage 13 between the nose and tail sections 15, 17. Wings 19 will be vertical when the airplane is in the takeoff and landing mode, shown in FIG. 1. Wings 19 will be horizontal when flying horizontally. The components of airplane 11 will be described assuming that the airplane is in horizontal flight, with the wings 19 horizontal. Each wing 19 has a wing tip section 21. The wing tip section 21 extends upward and outward from the remaining portion of wing 19. The included angle 22 between the wing 19 and the wing tip section 21 is about 120 degrees.

Each wing 19 also has a rear wing extension 23. The wing extension 23 extends rearward from the remaining portion of the wing 19. The rear extension 23 does not extend the full wing dimension laterally outward from the fuselage 13. Rather, each wing extension 23 extends about half the distance from fuselage 13 to the wing tip section 21. The wing extensions 23 lower the center of lift to a point slightly below the leading edge of the wings 19.

A control surface 25 forms the trailing edge of each wing extension 23. Control surface 25 will move relative to the fuselage 13 to provide flight control. When fuselage 13 is horizontal, the movement of the control surfaces 25 is a pivotal up and down movement. Control surfaces 25 serve the same function as ailerons would on a conventional airplane. Control surfaces 25 may also serves as elevators.

Figure 5:
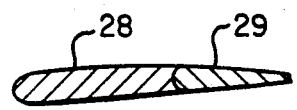
FIG. 5 is a simplified sectional view of the airplane of FIG. 1, taken along the line V—V of FIG. 3.

Two horizontal forward airfoils 27, 28 locate between the wings 19 and nose section 15. The horizontal forward airfoils 27, 28 resemble short wings. Each extends outward from fuselage 13 parallel to the wings 19. Each horizontal forward airfoil 27, 28 has a control surface 29. The control surface 29 is movable relative to fuselage 13. When the fuselage 13 is horizontal, the control surfaces 29 will move up and down in pivotal movement in the same fashion as elevators on conventional airplane tail sections. As shown in FIG. 5, each airfoil 27, 28 has the shape of an airfoil or wing with a generally flat bottom and a convex upper side.

Figure 3:
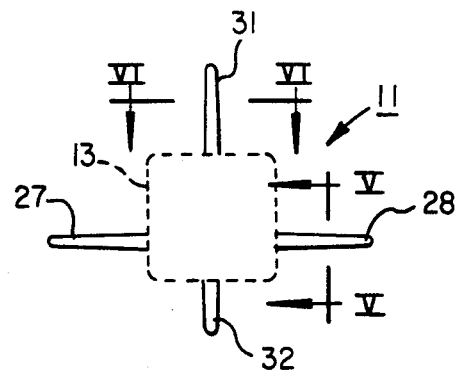
FIG. 3 is a simplified sectional view of the airplane of FIG. 1, taken along the line III—III of FIG. 1.
Figure 4:
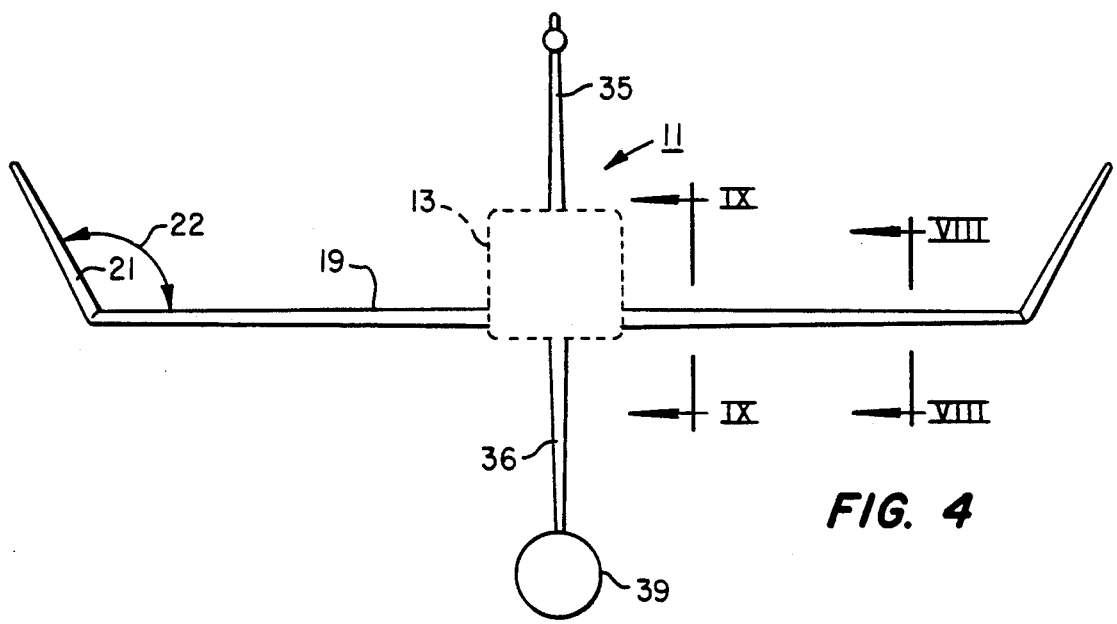
FIG. 4 is a simplified sectional view of the airplane of FIG. 1, taken along the line IV—IV of FIG. 1.
Figure 6:
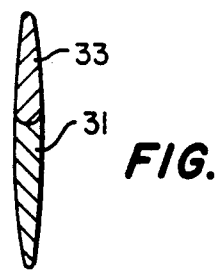
FIG. 6 is a simplified sectional view of the airplane of FIG. 1, taken along the line VI—VI of FIG. 3.
Figure 7:
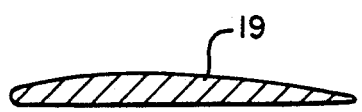
FIG. 7 is a simplified sectional view of the airplane of FIG. 1, taken along the line VIII—VIII of FIG. 4.
Figure 8:
FIG. 8 is a simplified sectional view of the airplane of FIG. 1, taken along the line IX—IX of FIG. 4.

Referring again to FIG. 1, a pair of vertical forward airfoils 31, 32 extend outward from opposite sides of fuselage 13 at the same point along the axis of fuselage 13 as the horizontal forward airfoils 27, 28. The vertical forward airfoils 31, 32 extend in a plane that is perpendicular to the plane containing the horizontal airfoils 27, 28. The upper airfoil 31 extends farther from fuselage 13 to its tip than the lower airfoil 32, as can be seen in FIG. 3. Both of the vertical airfoils 31, 32 have lengths from the fuselage 13 to their tips that are less than the lengths of the horizontal airfoils 27, 28. As shown in FIG. 6, the vertical forward airfoils 31, 32 are symmetrical in cross section. Each side is convex. Each vertical forward airfoil 31, 32 has a control surface 33 on its trailing edge. Control surface 33 can be moved pivotally from one side to the other in the same form as a rudder on a conventional airplane. The control surfaces 29, 33 cooperate to provide pitch and yaw control.

A pair of vertical rearward airfoils 35, 36 locate at the tail section 17. The rearward airfoils 35, 36 extend upward and downward from fuselage 13 in a plane perpendicular to the plane containing wings 19. The vertical rearward airfoils 35, 36 are symmetrical, having convex sides similar to that of the forward vertical airfoils 31, 32. Similarly, each vertical rearward airfoil 35, 36 has a control surface 37 on its trailing edge. The control surfaces 37 will move pivotally from side to side, functioning with the control surfaces 25 to control roll. Control surfaces 25 may also serve as rudders.

An instrument pod 39 mounts to the lower end of the lower vertical rearward airfoil 36. Instrument pod 39 will contain cameras and other equipment used for surveillance. Each vertical rearward airfoil 35, 36 is of a greater length, measured from fuselage 13 to the tip, than the lengths of the forward vertical airfoils 31, 32.

The fuselage 13 will contain control equipment for controlling the various control surfaces 25, 29 and 33. In the embodiment shown, the control equipment, the propeller collective pitch, and the engine will be remotely controlled by an operator utilizing a radio transmitter.

Four landing gears 41 mount to the tail section 17. One landing gear 41 locates at the tip of each of the vertical rearward airfoils 35, 36. The other two landing gears 41 locate at the outer edges of the wing extensions 23. Each landing gear has a wheel 43. Preferably, the steering shafts of wheels 43 are locked so that they cannot turn. Rather, they will roll only in a straight line. The wheels 43 on the two landing gears 41 mounted to the wing extensions 23 will roll only on a straight line that is parallel with the wings 19. The wheels 43 mounted to the rearward vertical airfoils 35, 36 will roll only on a straight line that is perpendicular to the wings 19. This prevents the airplane 11 from moving transversely while on a deck of a moving ship. This locking alignment of wheels 43 also reduces the tendency for the airplane 11 to tip over while landing.

A propeller 45 locates at the nose section 15. Propeller 45 in the first embodiment has two blades and is driven on a rotating shaft by an engine (not shown). Propeller 45 in the first embodiment is of a collective pitch type. The pitch does not vary as a blade of the propeller 45 makes a single rotation. Propeller 45 may be of a variable collective pitch type. That is, the operator may change the pitch of the propeller 45 during flight, but once changed, the pitch will remain constant during each cycle of rotation until changed again.

The diameter of propeller 45 is about 20 per cent greater than the dimension between the tips of airfoils 27 and 28. The radius of propeller 45 is less than distance from the fuselage axis to the instrument pod 39. This places the instrument pod 39 at a lower elevation than the tips of the propeller 45 when in horizontal flight.

Figure 2:
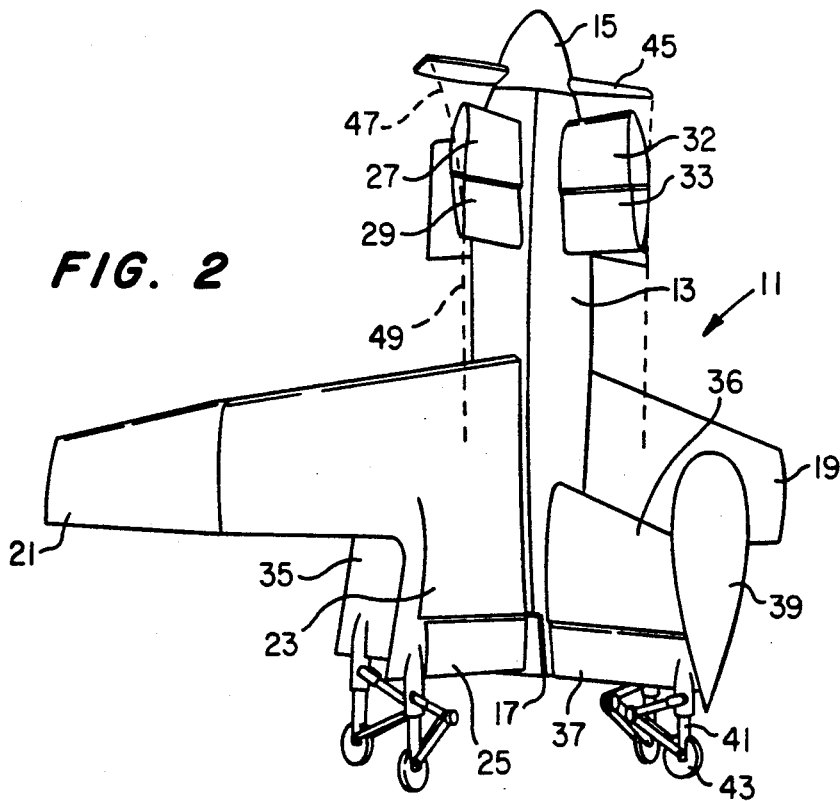
FIG. 2 is a perspective view, as seen from the lower side, of the tail sitter airplane of FIG. 1.

The propeller 45 will have a slip-stream 47. The slip-stream 47 flows over the forward airfoils 27, 28, 31, and 32. The diameter of the slip-stream is approximately the dimension between the tips of airfoils 27 and 28 at the trailing edge of the airfoils 27 and 28. The slip-stream 47 will gradually reduce in diameter until reaching a point a short distance downstream of the trailing edges of the forward airfoils 27, 28, 31, and 32. The area of the slip-stream at this location is referred to as the "contracted slip-stream" and is shown by the numeral 49 in FIG. 2.

The contracted slip-stream 49 has a circumference. The circumference of the contracted slip-stream 49 will be used to determine the desired chord lengths of the various airfoils 27, 28, 31, 32, 35, 36, wings 19, and wing extensions 23. A chord length is the dimension of an airfoil from the leading edge to the trailing edge, measured along a line that is parallel with the longitudinal axis of the fuselage 13. The chord length varies for wings 19 from the root connection at the fuselage 13 to the wing tip sections 21. Similarly, the vertical rearward airfoils 35, 36 vary in chord length. The chord length will be sized herein at the outer radial point where the slip-stream 47 passes over the wings 19 and vertical rearward airfoils 35, 36.

Forward airfoils 27 will have a selected chord length extending from the leading edge to the trailing edge of control surface 29, measured at the tips. The remaining airfoils 28, 31 and 32 will have the same chord lengths. The rearward airfoils 35, 36 will each have a chord length extending from the leading edge to the trailing edge of each control surface 37. These chord lengths will be identical and measured at the outer radius of the slip-stream 47 at that point. The wings 19 will have a chord length that extends from the leading edge to the trailing edge of the control surface 25, measured at the outer radius of the slip-stream 47. The outer radius will be within the wing extension portion 23.

The chord lengths of each wing 19, and each of the various airfoils 27, 28, 31, 32 and 35, 36 will be added up to form a sum. The sum of the chord lengths must be approximately equal to or greater than the circumference of the slip-stream 47 at the contracted diameter portion 49. By doing this, sufficient airfoil surfaces will be provided to straighten the swirling path of the slip-stream 47. This counters the rotational torque and prevents the airplane 11 from rolling during take-off and landing.

In the operation of the first embodiment, the airplane will take off and land in the position shown in FIG. 1. The propeller 45 will discharge a slip-stream 47. The slip-stream 47 will flow over the forward airfoils 27, 28 and 31, 32, the innermost portions of wings 19 and wing extensions 23, and the rearward airfoils 35, 36. This causes the control surfaces 29, 25, 33 and 37 to function as control surfaces. These control surfaces will be controlled by the operator to direct and stabilize the airplane, particularly during takeoff and landing.

As the airplane takes off, at a sufficient elevation, it will begin a transition to horizontal flight. During the transition, the portion of the wings 19 that are outboard of the slipstream 47 may encounter excessive angle of attack and have flow separation and stall. The undesirable effects of wing stalling are mitigated and stabilized by the wing tip sections 21. Wing tip sections 21 are set at such an angle 22 that they do not stall during the transition.

Figure 9:
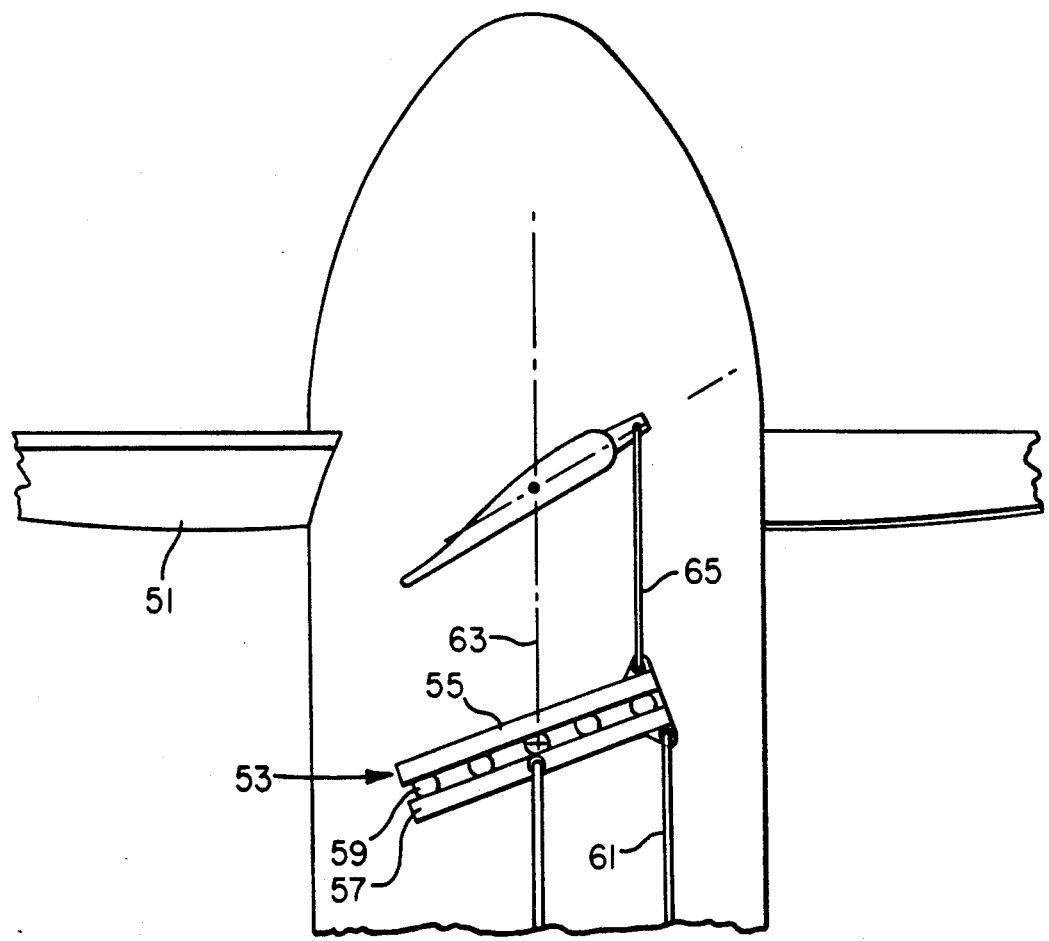
FIG. 9 is a simplified schematic view illustrating an alternate embodiment of the airplane of FIG. 1.

In the embodiment of FIG. 9, the control of the flight of airplane 11 during takeoff and landing is not handled by the control surfaces 29, 33 on the forward airfoils 27, 28, 31, 32 as shown in FIG. 1. Rather, the forward airfoils 27, 28, 31 and 32 will be entirely omitted. Sufficient chord length is provided in the remaining airfoils and wings (not shown) to counter the rotational torque as described above. In the embodiment of FIG. 9, the control of the flight at takeoff and landing will be handled by a cyclic pitch propeller 51. The remaining portion of the airplane will appear as in FIGS. 1 and 2 and is not shown.

Cyclic pitch propeller 51 is of a type that can vary its pitch cyclically like a helicopter rotor. As shown schematically, the control system will have a swash plate 53 which will cause the propeller 51 to change pitch as each blade of propeller 51 rotates through a single revolution. Swash plate 53 has a forward plate 55 and a rearward plate 57. Bearings 59 allow the forward plate 55 to rotate with the propeller 51. Control linkages 61 will be controlled by the operator to vary the angle of the swash plate 53 relative to the fuselage axis 63. Propeller linkage 65 will cause each blade of the propeller 51 to change pitch or inclination in proportion to the movement of the control linkage 61.

Because of the inclination of the swash plate 53, the pitch of each blade of propeller 51 changes as it makes each rotation. The amount of change in pitch during each revolution depends on the angle of the swash plate 53. This change will allow the airplane 11 to be controlled during takeoff and landing as well as assist during horizontal flight.

The invention has significant advantages. The chord lengths will be sized so that in both embodiments, torque can be countered without the need for any additional rotational devices. Counter rotating propellers are not needed. In the first embodiment, the forward airfoils allow the airplane to be controlled during take-off and landing, by utilizing the flow of air by the propeller over the airfoils, which have control surfaces. The instrument pod locates on the lower end of the lower vertical stabilizer, below the elevation of the propeller. Therefore, the cameras can view forward without the propeller obstructing the view.

While the invention has been shown in only two of its forms, it should be apparent to those skilled in the art that it is not so limited, but is susceptible to various changes without departing from the scope of the invention.

I claim:

1. In a single engine tail sitter airplane of a type which has a fuselage with a nose section and a tail section, the airplane being capable of taking off and landing on the tail section with the nose section pointed up for vertical flight and also being capable of cruising with the fuselage horizontal for horizontal flight, the improvement comprising in combination:

the airplane having a single driven propeller, the propeller being mounted to the nose section of the fuselage and driven by the engine for creating a slip-stream;

a pair of wings extending from the fuselage;

a first tail airfoil extending from the fuselage transverse to the wings and forming a part of the tail section;

an array of forward airfoils;

control surface means mounted to and forming a part of each of the forward airfoils, the control surface means being movable relative to the fuselage for providing flight control of the airplane;

means for mounting the forward airfoils to the fuselage in positions for controlling pitch and yaw of the airplane with the control surface means, each of the forward airfoils extending from the fuselage at a location between the wings and the propeller so as to be within slip-stream of the propeller for controlling flight during takeoff and transition from vertical to horizontal;

landing gear means located at the tail section for supporting the airplane on the tail section during take-off and landing with the nose of the fuselage pointed up; and the wings and the forward airfoils having chord dimensions sufficient to remove all of the torque due to the rotating propeller during vertical flight so as to eliminate the need for counter rotating propellers.

2. The airplane according to claim 1, further comprising:

a second tail airfoil extending from the fuselage transverse to the wings and forming a part of the tail section.

3. The airplane according to claim 2 wherein each of the first and second tail airfoils have control surface means which are movable relative to the fuselage for providing flight control of the airplane.

4. The airplane according to claim 1 wherein each of the wings have rearward portions which extend to and form a part of the tail section of the fuselage.

5. The airplane according to claim 4 wherein each of the rearward portions of the wings have control surface means which are movable relative to the fuselage for providing flight control of the airplane.

6. The airplane according to claim 1 wherein the propeller is a collective pitch type.

7. In a single engine tail sitter airplane of a type which has a fuselage with a forward end and a rearward end, the airplane being capable of taking off and landing in vertical flight on a rearward end of the airplane with the forward end pointed up and also being capable of cruising in horizontal flight with the fuselage horizontal, the improvement comprising in combination:

the airplane having a single driven propeller, the propeller being mounted to the forward end of the fuselage and driven by the engine for creating a slip-stream;

a pair of wings extending horizontally from the fuselage, the wings being free of any propellers being mounted thereto;

an upper tail airfoil extending vertically from the fuselage perpendicular to the wings at the rearward end of the airplane;

an lower tail airfoil extending vertically at the rearward end of the airplane from an opposite side of the fuselage from and parallel with the upper tail airfoil;

horizontal control surfaces means located at the rearward end of the airplane which are movable relative to the fuselage for providing flight control of the airplane;

a pair of horizontal forward airfoils extending from opposite sides of the fuselage parallel with the wings and located between the wings and the propeller;

a pair of vertical forward airfoils extending from opposite sides of the fuselage parallel with the upper tail airfoil and located between the wings and the propeller;

each of the horizontal and vertical forward airfoils having control surface means which are movable relative to the fuselage for providing flight control of the airplane;

each of the upper and lower tail airfoils having tail control surface means which are movable relative to the fuselage for providing flight control of the airplane;

horizontal and vertical forward airfoils being positioned in the slip-stream to control vertical flight of the aircraft during takeoff and to control flight during transition from vertical to horizontal flight; and the wings and the forward airfoils having chord dimensions sufficient to remove all of the torque due to the rotating propeller during vertical flight, eliminating the need for counter rotating propellers.

8. The airplane according to claim 7 wherein:

the slip-stream of the propeller has a diameter at the trailing edge of the forward airfoils; and wherein the distance from the tip of one of the horizontal airfoils to the tip of the other horizontal airfoil is substantially the same as said diameter of the slip-stream.

9. The airplane according to claim 7 wherein a portion of each wing extends to the rearward end of the airplane and carries the horizontal control surface means.

10. The airplane according to claim 7 wherein the propeller has a collective pitch.

11. In a single engine tail sitter airplane of a type which has a fuselage with a forward end and a rearward end, the airplane being capable of taking off in vertical flight and landing on the rearward end with the forward end pointed up and also being capable of cruising with the fuselage horizontal, the improvement comprising in combination:

the airplane having a single driven propeller, the propeller being of a cyclic pitch per revolution type mounted to the forward end of the fuselage and driven by the engine;

means for controlling the cyclic pitch of the propeller to control the flight of the airplane;

a pair of wings extending from the fuselage;

a plurality of rearward airfoils extending from the fuselage at the rearward end of the airplane;

control surface means on the rearward airfoils which are movable relative to the fuselage for providing flight control of the airplane;

the propeller having a slip-stream which flows over the wings and rearward airfoils;

each of the airfoils and the wings having a chord dimension measured from a leading edge to a trailing edge of each of the airfoils and the wings and measured substantially at the outer point of contact of the slip-stream;

the chord dimensions being sufficiently large to counter all of the rotational torque produced by the propeller during vertical flight to prevent rolling of the airplane, eliminating the need for counter rotating propellers; and landing gear means at the rearward end of the airplane for supporting the aircraft on its rearward end during take-off and landing.

12. The airplane according to claim 11 wherein;

the slip-stream has a contracted diameter area at a designated point downstream of the propeller, the contracted diameter area having a circumference; and wherein the sum of all of the chord dimensions of the airfoils and wings is at least approximately equal to the circumference of the contracted diameter area.

13. In a single engine tail sitter airplane of a type which has a fuselage with a forward end and a rearward end, the airplane being capable of taking off and landing in vertical flight on a rearward end of the airplane with the forward end pointed up and also being capable of cruising in horizontal flight with the fuselage horizontal, the improvement comprising in combination:

the airplane having a single driven propeller, the propeller being mounted to the forward end of the fuselage;

a pair of wings extending horizontally from the fuselage;

a pair of vertical tail airfoils extending oppositely from the fuselage perpendicular to the wings at the rearward end of the airplane;

each of the wings having an inner portion that extends to the rearward end of the airplane;

horizontal control surface means located at a trailing edge of the inner portion of each of the wings for providing flight control of the airplane;

each of the wings having an outer portion which extends outward from the inner portion of each of the wings and which has a trailing edge that is substantially parallel to but forward of the trailing edge of the inner portion of each of the wings;

a plurality of forward airfoils extending from the fuselage and located between the wings and the propeller;

the forward airfoils having control surface means which are movable relative to the fuselage for providing pitch and yaw flight control of the airplane;

each of the tail airfoils having tail control surface means which are movable relative to the fuselage for providing flight control of the airplane;

the propeller having a slip-stream which flows over all of the airfoils and the inner portion of the wings, allowing the forward airfoils to control flight during vertical flight;

each of the airfoils and the inner portions of the wings having a chord dimension measured from a leading edge to a trailing edge of each of the airfoils and the wings and measured substantially at the outer point of contact of the slip-stream;

the chord dimensions of the airfoils and the inner portions of the wings measured at the outer points of contact of the slip-stream of the propeller being sufficiently large to counter all of the rotational torque produced by the propeller to prevent rolling of the airplane during vertical flight, eliminating the need for counter rotating propellers; and landing gear means at the rearward end of the airplane for supporting the aircraft on its rearward end during take-off and landing, the landing gear means being mounted to the inner portion of each of the wings and to the tail airfoils.

14. The airplane according to claim 13, wherein the propeller has a contracted diameter area at a designated point downstream of the propeller, the contracted diameter area having a circumference; and the sum of all of the chord dimensions of the airfoils and the inner portions of the wings measured at the outer points of contact with the slip-stream of the propeller is at least approximately equal to the circumference of the contracted diameter area to counter all of the rotational torque produced by the propeller to prevent rolling of the airplane during vertical flight.

15. The airplane according to claim 13 wherein the propeller has a collective pitch per revolution.

* * * * *